United States Patent [19]
> Moran

[11] 4,034,944
[45] July 12, 1977

[54] STRAIN-RELIEF BUSHING
[75] Inventor: Thomas M. Moran, Cleveland, Ohio
[73] Assignee: Eaton Corporation, Cleveland, Ohio
[21] Appl. No.: 422,235
[22] Filed: Dec. 6, 1973

Related U.S. Application Data
[63] Continuation-in-part of Ser. No. 361,737, May 18, 1973.
[51] Int. Cl.² ......................................... F16L 5/00
[52] U.S. Cl. ............................ 248/56; 174/153 G; 339/103 B
[58] Field of Search ............ 248/73, 56; 174/65 G, 174/152 G, 153 G; 339/103 B, 126 R, 126 RS, 128; 16/2

[56] References Cited
U.S. PATENT DOCUMENTS

| | | | |
|---|---|---|---|
| 1,098,775 | 6/1914 | Wheelock | 174/152 G |
| 2,277,637 | 3/1942 | Eby | 174/153 G |
| 2,424,757 | 7/1947 | Klumpp | 16/2 UX |
| 2,459,370 | 1/1949 | Ferguson et al. | 174/152 G X |
| 2,563,604 | 8/1951 | Hultgren | 16/2 UX |
| 2,573,600 | 10/1951 | Pruehs | 248/56 UX |
| 2,664,458 | 12/1953 | Rapata | 174/153 G |
| 2,974,186 | 3/1961 | Klumpp | 16/2 X |
| 3,056,852 | 10/1962 | Sachs | 174/153 G |
| 3,258,234 | 6/1966 | Fernberg | 248/56 |
| 3,562,847 | 2/1971 | Jemison | 248/56 X |
| 3,689,014 | 9/1972 | Fink | 248/56 |

Primary Examiner—Roy D. Frazier
Assistant Examiner—Rodney H. Bonck
Attorney, Agent, or Firm—Teagno & Toddy

[57] ABSTRACT

A molded, one-piece, self-locking, strain-relief bushing for mounting an electrical conductor to a panel having an aperture through which the conductor passes. The bushing is designed to mount the conductor substantially parallel to the panel on one side thereof and substantially perpendicular to the panel on the other side thereof. The bushing comprises two generally concave complementary portions adapted to be folded together in axially offset position over the conductor. One of the complementary portions is frangibly attached to the other and is adapted to be sheared therefrom for self-locking mounting of the conductor to the panel. The busing may be preassembled by hand and self-lockingly installed by a simple hammer blow.

9 Claims, 5 Drawing Figures

U.S. Patent         July 12, 1977         4,034,944
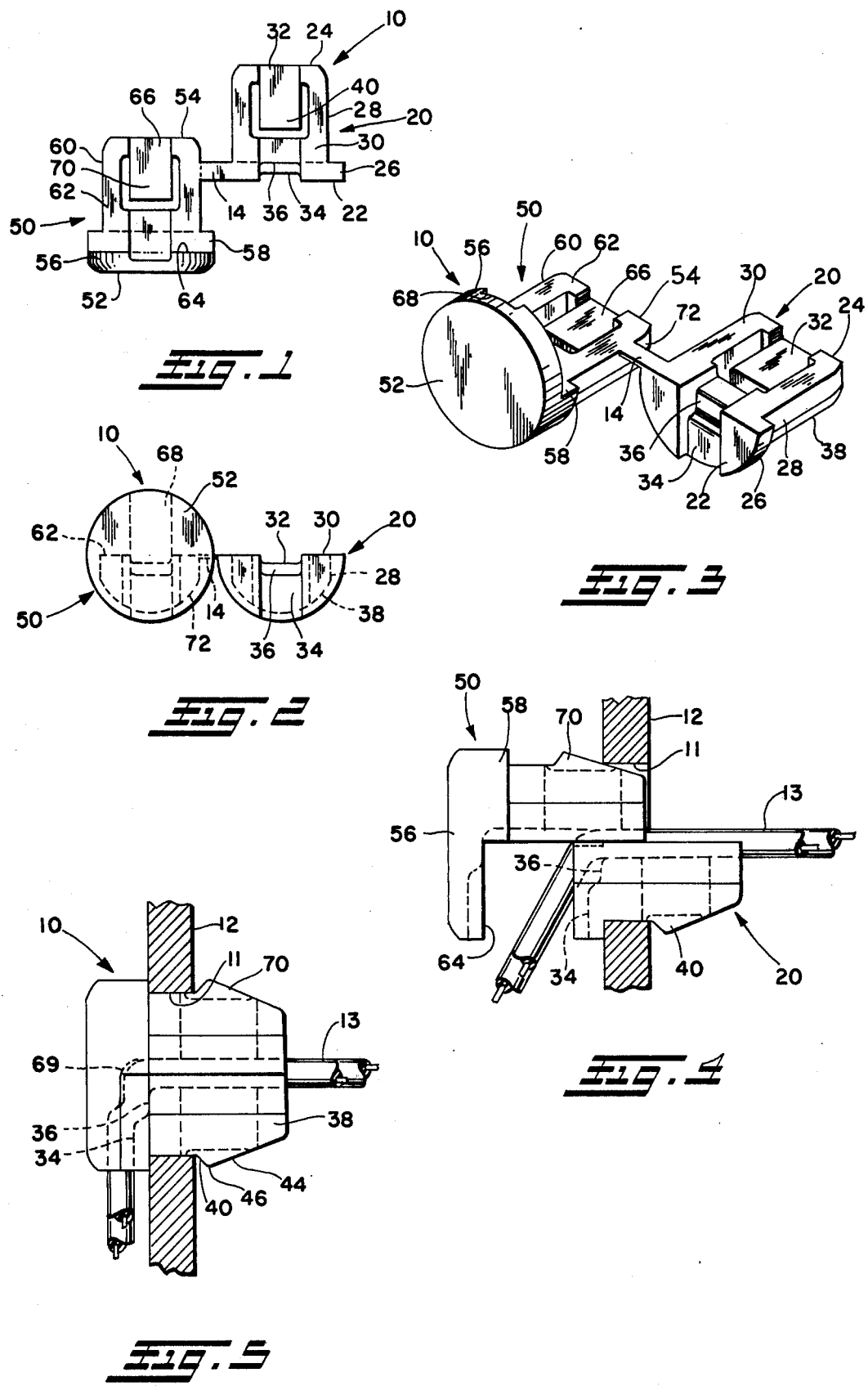

STRAIN-RELIEF BUSHING

CROSS-REFERENCE TO RELATED APPLICATIONS

This application is a continuation-in-part of my copending application Ser. No. 361,737 filed May 18, 1973.

BACKGROUND OF THE INVENTION

1. Field of the Invention

This invention relates to molded, one-piece, self-locking, strain-relief bushings and more particularly relates to molded, one-piece, self-locking, strain-relief bushings for mounting a conduit or conductor to a panel having an aperture through which the conduit passes such that the conduit or conductor is mounted substantially parallel to the panel on one side thereof and substantially perpendicular to the panel on the other side thereof.

2. Description of the Prior Art

One-piece, molded strain-relief bushings are known in the prior art. Heretofore such bushings have comprised an essentially, semi-cylindrical base portion which received a conductor extending therethrough and a locking portion secured to the base portion by a flexible web. The locking portion fits into an especially configured recess within the base portion and had to be securely held therein by an especially formed pair of pliers while simultaneously being forced into the aperture in the support panel. This cumbersome assembly method was further complicated by the flexible web which could "hang up" on the edge of the aperture while the bushing was being jostled into position. Furthermore, the prior art bushings did not provide for mounting a conductor or conduit parallel to a panel on one side thereof and perpendicular on the other side thereof. Such a "right angle mounting" is desirable in many situations such as where space is limited and it is desirable to run the conductor along one side of the panel.

Furthermore, when prior art bushings were assembled into the support panel's aperture, the frictional locking engagement between bushing and conductor occured primarily at the edge of the aperture. Thus the conductor was frictionally secured within the bushing solely by a limited line loading about the aperture. Because the loading was confined to a limited surface, the conductor must be locked tighter than what otherwise might be possible and accordingly the distortion of and possible damage to the conductor resulting from such concentrated loading is somewhat greater than what is otherwise possible.

Summary of the Invention

In accordance with the present invention, the drawbacks of the prior art have been overcome to the extent that a molded, one-piece, self-locking, strain-relief bushing for mounting a conductor to a panel having an aperture through which the conductor passes with the conductor parallel to the panel on one side therof and perpendicular to the panel on the other side thereof has been provided. The strain-relief bushing of the present invention is easily installed requiring only a hammer or similar object for final self-locking assembly to the panel.

In the preferred embodiment, the bushing is molded as a one-piece assembly having two substantially concave complementary portions attached by a flexible, frangible web and adapted to be folded about the conductor. In the preassembled position the bushing is positioned in the panel aperture and a hammer blow will shear the two complementary portions and simultaneously self-lockingly mount the bushing and conductor to the panel.

An object of this invention is to provide a new and improved strain relief bushing.

Another object of the present invention is to provide a molded, one-piece strain relief bushing for the substantially right angle mounting of a conductor to an apertured panel which requires only readily available tools for self-locking installation thereof.

A further object of the present invention is to provide an easily installed, right angle strain relief bushing having improved frictional characteristics which do not excessively deform or distort the electrical conductor secured therein.

These and other objects and advantages of the present invention will become apparent from a reading of the detailed description of the preferred embodiment taken in connection with the accompanying drawings.

BRIEF DESCRIPTION OF THE DRAWINGS

FIG. 1 is a front elevational view of the strain relief bushing of the present invention as molded.

FIG. 2 is a top view of the strain relief bushing of the present invention as molded.

FIG. 3 is a front perspective view of the strain relief bushing of the present invention as molded.

FIG. 4 is a side view in section of the strain relief bushing of the present invention in the preassembled position.

FIG. 5 is a side view in section of the strain relief bushing of the present invention in the installed position.

DESCRIPTION OF THE PREFERRED EMBODIMENT

Referring now to the drawings wherein the showings are for the purpose of illustrating a preferred embodiment of the invention only and not for the purpose of limiting the same, there is shown in FIGS. 1 through 3 a unitary, self-locking, strain-relief bushing 10 of the subject invention as molded. Strain-relief bushing 10 is adapted to be self-lockingly applied by means of tool such as a hammer to an aperture 11, in a support panel 12 for self-lockingly securing a conductor 13 therein (FIGS. 4-5).

It is understood the term conductor is used for illustrative purposes only and includes devices such as wires, flexible tubing, conduits and the like.

Strain-relief bushing 10 may be viewed as having a molded first position (FIGS. 1 through 3), a preassembled second position (FIG. 4) and an assembled third position (FIG. 5) and may best be described by detailed reference to its structure in the molded position. The strain-relief bushing 10 as thus shown in FIGS. 1 through 3 comprises two generally concave complementary portions 20 and 50 joined together by a flexible, frangible web 14.

Complementary portion 20 includes a top end 22, a bottom end 24, a cross-sectionally semi-circular flange 26 adjacent the top end 22 and an axially extending, cross-sectionally semi-circular shank section 28 extending from the flange 26 to the bottom end 24. Of course, flange 26 may have any cross-sectional shape sufficient to preclude passage thereof through aperture 12 when mated with its complementary flange and shank section 28 may have any cross-sectional shape which will pass through and conform with aperture 12 when mated with its complementary shank section. Both flange 26 and shank section 28 share a common, substantially flat, smooth surface 30 which is generally normal to top end 22. Extending axially through the shank section 28 and opening to smooth flat surface 30 is slot 32 which intersects radially outwardly extending slot 34 which passes through the flange 26 and opens to the top end 22. Slot 32 extends completely from the top end 22 to the bottom end 24 while slot 34 extends from flat surface 30 to the outer circumference of flange 26. It is noted that at the intersection of slots 32 and 34 an additional cutout and/or configured portion 36 may be present for a purpose to be explained below.

Extending radially outwardly from the curved exterior surface 38 on the shank section 28 is a depressible cammed projection means 40 for retaining the shank portion 28 within aperture 12. Cammed projection means 40 includes a first outwardly tapering surface 42, and a second outwardly tapering surface 44 both of which meet at apex 46. The axial distance between apex 46 and the flange 26 is equal to or greater than the thickness of the thickest panel in which the bushing 10 will be mounted while the axial distance between the most radially inward point of tapering surface 42 and the flange 26 is equal to or less than the thinnest panel to which bushing 10 will be mounted. The bushing of the present invention will thus self-lockingly mount with panels having a given range of panel thickness.

Complementary portion 50 includes a top end 52, a bottom end 54, a cross-sectionally circular cap 56 adjacent the top end 52, a cross-sectionally semi-circular flange 58 adjacent and integral with the cap 56, and an axially extending, cross-sectionally semi-circular shank section 60. Of course, cap 56 and flange 58 may have any shape which when mated with complementary flange 26, will preclude passage thereof through aperture 12 and shank section 60 may have any cross-sectional shape which when mated with complementary shank section 28, will pass through aperture 12 and conform thereto. Both flange 58 and shank section 60 share a common, smooth, substantially flat surface 62 which may be coplanar with surface 30 of complementary portion 20. Extending generally normally to surface 62 is the cap 56 which includes a downwardly facing surface 64 which extends on the opposite side of the plane of surface 62 as the flange 58 and shank 60. Extending axially from the bottom end 54 to the downwardly facing surface 64 is slot 66 which opens to flat surface 62 in the same direction as slot 32 opens to flat surface 30. Slot 66 is intersected by slot 68 which extends radially outwardly from slot 66 to the radially outer circumference of cap 56 and opens to downwardly facing surface 64. The intersection of cavities 66 and 68 may include a cutout and/or configuration 69 complementary to 36 discussed above.

Complementary portion 50 includes a depressible cammed projection 70 extending radially outwardly from the curved exterior surface 72 of shank section 60. The shape of projection 70 and the axial relationship between projection 70 and flange 56 is substantially identical as that of projection 40 and flange 26 discussed above.

Complementary sections 20 and 50 are joined by a flexible, frangible web 14 which extends transversely from the flange 26 of portion 20 to a midpoint of shank section 60 of portion 50. As may be more clearly seen in FIG. 4, web 14 allows complementary portions 20 and 50 to be folded flat surface 30-to-flat surface 62. In this position, the preassembled position, slots 32 and 66 are aligned and define an axially extending conductor receiving cavity therebetween in which conductor 13 may be received. Complementary member 20 is axially offset complementary member 50 by at least the thickness of the panel and thus slots 34 and 68 are aligned but axially separated. In this position, protuberances 40 and 70 are axially offset sufficiently that member 20 may be easily positioned in the aperture 12 with the flange 26 on one side of the panel, protuberance 40 on the other side of the panel while member 50 only partially extends into the aperture 12 and protuberance 70 has not yet entered the aperture.

A sharp axial blow to head 56 will shear web 14 and force shank 60 into the aperture 12 such that flange 58 will engage the panel and align with flange 26 while protuberance 70 will engage the other side of the panel and align with protuberance 40 locking the bushing 10 to the panel 12. In this assembled position, as is seen in FIG. 5, the slots 34 and 68 are brought together to define a radially extending cavity therebetween which intersects the axially extending cavity defined by slots 32 and 66. The cavities thus defined provide in at least one point, a slightly smaller cross-sectional area than conductor 13, to grip same. The change in direction of conductor 13 as it extends from the axial to the radial cavity will also tightly fix same to bushing 10. If additional gripping is required, complementary irregularities or configurations 36 and 69 may be utilized to grip the conductor 13 therebetween. The complementary irregularities 36 and 69, may also be used to provide for a plurality of smaller, more gradual bends, say two 45° bends, rather than a single 90° bend which may be too severe for the conductor.

Although this invention has been described in its preferred form with a certain degree of particularity, it is understood that the present disclosure of the preferred form has been made by way of example only and that numerous changes in the details of construction and combination and arrangement of parts may be resorted to without departing from the spirit and the scope of the invention as hereinafter claimed.

I claim:
1. A molded, one-piece, self-locking, strain-relief bushing assembly for mounting a conductor relative to a panel of predetermined thickness having an aperture through which the conductor passes such that the conductor will extend substantially normal to the panel on one side thereof and substantially parallel to the panel on the other side thereof, said bushing comprising:
a first complementary bushing member having an angled passageway for accepting a conductor therethrough; and
a second complementary bushing member being mateable with said first bushing member and having an angled passageway for accepting a conductor therethrough, each of said angled passageways having an axially extending portion and an intersecting radially extending portion, said first and second bushing members being hingeably connected by a flexible and frangible web that will allow said first member to be foldingly mated with said second member such that said first member is axially offset said second member to allow said first member of said bushing assembly to easily fit through the panel aperture with said second member extending only partially into the panel aperture and will then break as second member is forced fully into said aperture locking said bushing to said panel and encapturing said conductor in the cavity formed by said angled passageways.

2. The bushing assembly of claim 1 wherein each complementary member has a flanged end and a shank end, said shank end adapted for insertion into the aperture and said flanges, when mated, precluding passage into the aperture, each shank end having an outwardly extending, resiliently depressible protuberance axially spaced from said flanges by approximately the thickness of said panel to grip one side of the panel when the flanges engage the other side of the panel.

3. The bushing assembly of claim 2 wherein said first and second members each have a substantially flat, slidable surface for mateable engagement with the surface of the other member and the axially extending portion of each said angled passageways opens to said surfaces to allow said members to be foldingly mated in slidable surface-to-slidable surface contact with the axially extending portions of said passageways defining an axially extending cavity for receipt of said conductor.

4. The bushing assembly of claim 2 wherein said members are axially offset when foldably mated by at least the thickness of the panel allowing said second protuberance to remain on one side of the panel as the first shank end is inserted into the aperture placing the first protuberance on the other side of the panel.

5. The bushing assembly of claim 3 wherein said first and second members are substantially semi-circular in cross-section, the flat surfaces are coplanar and the curved circumference of both members extends in the same direction from said flat surfaces.

6. A molded, one-piece, self-locking strain relief bushing for holding a conductor fixed relative to an aperture in a support panel of predetermined thickness through which the conductor passes with the conductor substantially parallel to the panel on one side thereof and substantially normal to the panel on the other side thereof, said bushing having a molded position, a preassembled position for easy positioning of said bushing in said aperture and an assembled position for self-locking engagement of said bushing to said panel and retention of said conductor in said bushing, said bushing comprising:

in the molded position a first and second complementary bushing member, each member having an axially extending shank for insertion into said aperture and a flange for limiting insertion into said panel, said shanks having axially extending passageways for receiving the conductor and said flanges having transversely extending passageways intersecting said axially extending passageways for receiving the conductor, said members being joined by a flexible frangible web;

in the preassembled position, said complementary members being folded together about said conductor to receive said conductor within said axially extending passageways, said first member being axially offset said second member to allow said first member to be fully inserted into said aperture with said second member extending only partially into said aperture; and in said assembled position said web being broken and said second member fully inserted into said panel aperture to axially align said first and second members, to lock said bushing to said panel and to encapture said conductor in said bushing such that the conductor extends substantially parallel to the panel on the side of the panel from which the bushing is inserted and substantially normal to the panel on other side thereof.

7. The bushing of claim 6 wherein said axially extending shanks each have a resiliently depressible protuberance extending radially outwardly from the circumference thereof, said protuberances axially spaced from said flanges by a distance substantially equal to the thickness of said support panel.

8. A molded, one-piece, self-locking, strain-relief bushing for holding a conductor fixed relative to an aperture in a support panel of predetermined thickness through which the conductor passes with the conductor substantially parallel to panel on the side of the panel from which the bushing is inserted into the aperture and substantially normal to the panel on the other side of the panel, said bushing comprising:

first and second complementary bushing members; and a flexible frangible web joining said members;

said first member including a substantially annular head, a cross-sectionally substantially semi-annular first flange axially adjacent to said head and a cross-sectionally substantially semi-annular first shank portion extending axially from said first flange, said first flange and said first shank portions partially defined by a substantially flat first surface extending from said head, said head having a first flat face in the direction of said first shank extending from said first flat surface in a direction opposite said first flange, said first surface having a first slot therein extending axially from said first face to the end of said first shank and said first face having a second slot extending radially outwardly from said first slot to the outer circumference of said head, said first shank having a resiliently depressible first protuberance on the exterior surface opposite said first flat surface, said first protuberance axially spaced from said first flange by a distance substantially equal the thickness of said panel;

said second member having a cross-sectionally substantially semi-annular second flange and second shank portion, said second flange having a substantially flat second face in a direction opposite said second shank, said second flange and second shank portion partially defined by a second flat surface having a third slot therein extending axially from the end of the second shank section to the second flat face and said second flat face having a fourth slot therein extending radially outwardly from said third slot to the outer circumference of said second flange, said second shank having a resiliently depressible second protuberance on the exterior surface opposite said second flat surface, said second protuberance axially spaced from said second flange by a distance substantially equal to the thickness of said panel;

said web extending substantially transversely from said first to said second members for folding of said members in first surface-to-second surface engagement with said conductor received in an axially extending cavity formed by said aligned first and third slots and said second member being axially offset said first member such that said second shank may be inserted into said aperture with said second flange engaging one side of said panel and said second protuberance engaging the other side of said panel while said first protuberance has not yet entered said panel, said web frangible by axial force on said head to allow said second member to be forced into said aperture causing said first and second flanges to both engage one side of said panel and said first and second protuberances to engage the other side of said panel thereby locking said bushing in said panel and to bring said first and second faces into contact encapturing said conductor in a right angle passageway through said bushing consisting of an axially extending cavity formed by said first and third slots and an intersecting radially extending cavity formed by said second and fourth slots.

9. The bushing of claim 8 wherein said substantially flat surfaces are on the same plane and said flanges and shanks extend from the same side of said plane when the bushing is molded.

* * * * *

UNITED STATES PATENT AND TRADEMARK OFFICE
CERTIFICATE OF CORRECTION

PATENT NO. : 4,034,944
DATED : 7/12/77
INVENTOR(S) : Thomas M. Moran

It is certified that error appears in the above-identified patent and that said Letters Patent are hereby corrected as shown below:

Col. 1, line 45: Occurred is misspelled.

Col. 5, line 4: "said" has been omitted before "second"/

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*